REDUCED TIME TRANSMISSION SYSTEM

Filed May 17, 1966 5 Sheets-Sheet 1

Inventor
ANDRÉ E. J. CHATELON
By Percy P. Lantzy
Attorney

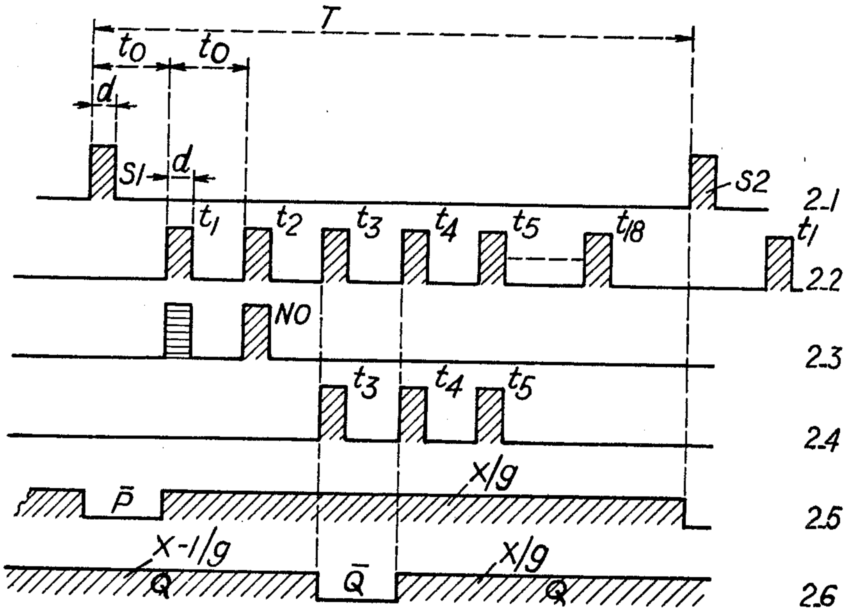
Fig. 2.
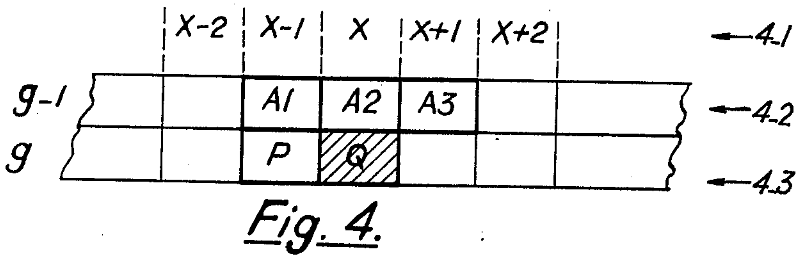
Fig. 4.
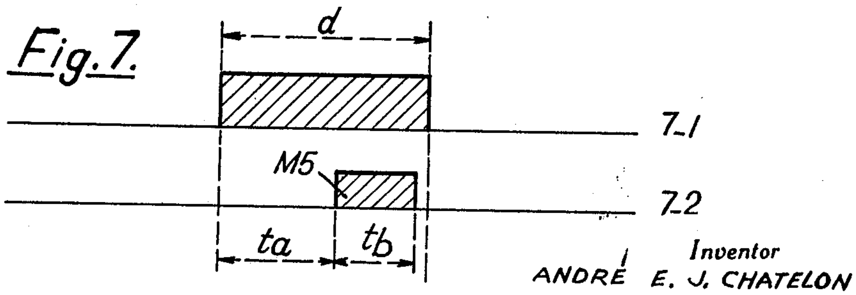
Inventor
ANDRÉ E. J. CHATELON
By Percy P. Lantzy
Attorney

REDUCED TIME TRANSMISSION SYSTEM

Filed May 17, 1966 5 Sheets-Sheet 3

Inventor
ANDRÉ E. J. CHATELON
By Percy P. Lantzy
Attorney

Nov. 11, 1969 A. E. J. CHATELON 3,478,163

REDUCED TIME TRANSMISSION SYSTEM

Filed May 17, 1966 5 Sheets-Sheet 4

Inventor
ANDRÉ E.J. CHATELON
By [signature]
Attorney

Inventor
ANDRÉ E. J. CHATELON

By Percy P. Lantzy
Attorney

United States Patent Office 3,478,163

Patented Nov. 11, 1969

3,478,163

REDUCED TIME TRANSMISSION SYSTEM

André Edouard Joseph Chatelon, Montrouge, France, assignor to International Standard Electric Corporation, New York, N.Y., a corporation of Delaware Filed May 17, 1966, Ser. No. 550,767
Claims priority, application France, June 23, 1965, 21,885
Int. Cl. H04n 7/12
U.S. Cl. 178—6 9 Claims

ABSTRACT OF THE DISCLOSURE

A coding process for a reduced-time transmission system wherein an address code is transmitted at each transition from white to black followed by repetition codes which are sent as long as the scanned dots are black. Before effecting the transition coding, the shade of the corresponding dot of the preceding scanned line and of the two adjacent dots on said line are examined, and if one of these three dots is black, there is transmitted only a particular repetition code which brings a substantial reduction of transmitted data.

The present invention concerns a coding process for reducing the bandwidth or the transmission time in an image transmission system wherein the information are obtained by scanning the surface of the images.

It is known that in facsimile, the image to be transmitted is analyzed line by line (the separation between lines ranging about 0.25 mm.) by means of a luminous scanning device which delivers a signal the amplitude of which, at each instant, represents the shade of the analyzed location. In constant shade zones, the amplitude of this signal is constant, and it is realized that the quantity of information it contains is practically nil and that the time during which this amplitude value is transmitted is lost.

The same applies for the case where each line is quantized into a certain number of "dots" (of length 0.25 mm. for instance) and when one transmits, a code characterizing this shade, such a code being reduced to one single digit 1 or 0, when the document is transmitted in black and white.

Facsimile systems enabling a reduction of the transmission time (or of the pass-band) are known in which one transmits, for each line, only the codes characterizing the length and the shade of each group of dots of the same shade. It will be noted that in these systems, each line of the document is analyzed independently without taking into account the information contained in the other lines.

In the facsimile system according to the invention, a coding of the information to be transmitted is carried out by noting the abscissa or "address" of each transition from black to white and the duration of this black. However, the address is transmitted only if an examination of certain dots contiguous to the anayzed point of abscissa $x$ has shown that all of them were of white shade. If one of these contiguous dots is black, only a repetition code is transmitted, which characterizes the position of this dot with respect to the analyzed one, this code including much less digits than an address code.

The contiguous dots examined belong either to the analyzed line (dot of abscissa $x-1$) or to the preceding line (dot of abscissa $x$ and a certain number of dots on both sides of dot $x$).

It is realized that this system, in which the information contained in the preceding line are taken into account, enables a further reduction of the quantity of information transmitted.

Thus, if the contiguous dots of the preceding line are the dots $x+1$, $x$, $x-1$, the abscissa code for a vertical dash or for a line having an inclination of about 45° is transmitted only once, the codes transmitted further on being repetition codes.

The object of the present invention is thus to reduce the quantity of information to be transmitted in a system of image analysis by surface scanning.

The present invention will be particularly described with reference to the accompanying drawings in which:

FIGURE 7 represents two diagrams of signals related to the reading of the memory MR.

Before starting the description of the invention, we shall briefly remind the principle of the notations in logical algebra which will be used in certain cases, in order to simplify the writing in the description of the logical operations. The subject is treated extensively in numerous papers and in particular in the book "Logical Design of Digital Computers" by M. Phister (J. Wiley, publisher).

Thus, if the condition characterized by the presence of a signal is written A, the condition characterized by the absence of the said signal will be written $\overline{A}$.

These two conditions are linked by the well known logical relation $Ax\overline{A}=0$, in which the sign $x$ is the symbol of the coincidence logical function or "AND" function.

If a condition C appears only if the conditions A and B are present simultaneously, one writes $AxB=C$ and this function may be achieved by means of a coincidence or AND circuit.

If a condition C appears when at least one of the two conditions E and F is present, one writes $E+F=C$ and this function is achieved by means of a mixing gate or OR circuit.

Since these logical functions AND and OR are commutative, associative and distributive, the following may be written: $A+B=B+A$; $Ax(B+C)=AxB+AxC$; $(A+B)(C+D)=AxC+AxD+BxC+BxD$ etc.

Last, a function of two variables A and B may present four possible combinations, and if one writes $AxB$, the three other combinations are represented as a whole by the expression $\overline{AxB}$.

Figures 1, 1A, 1B, 1C, 1D, 1E, 1F, 1G, 1H, 1I, 1J, 1K, 1M:
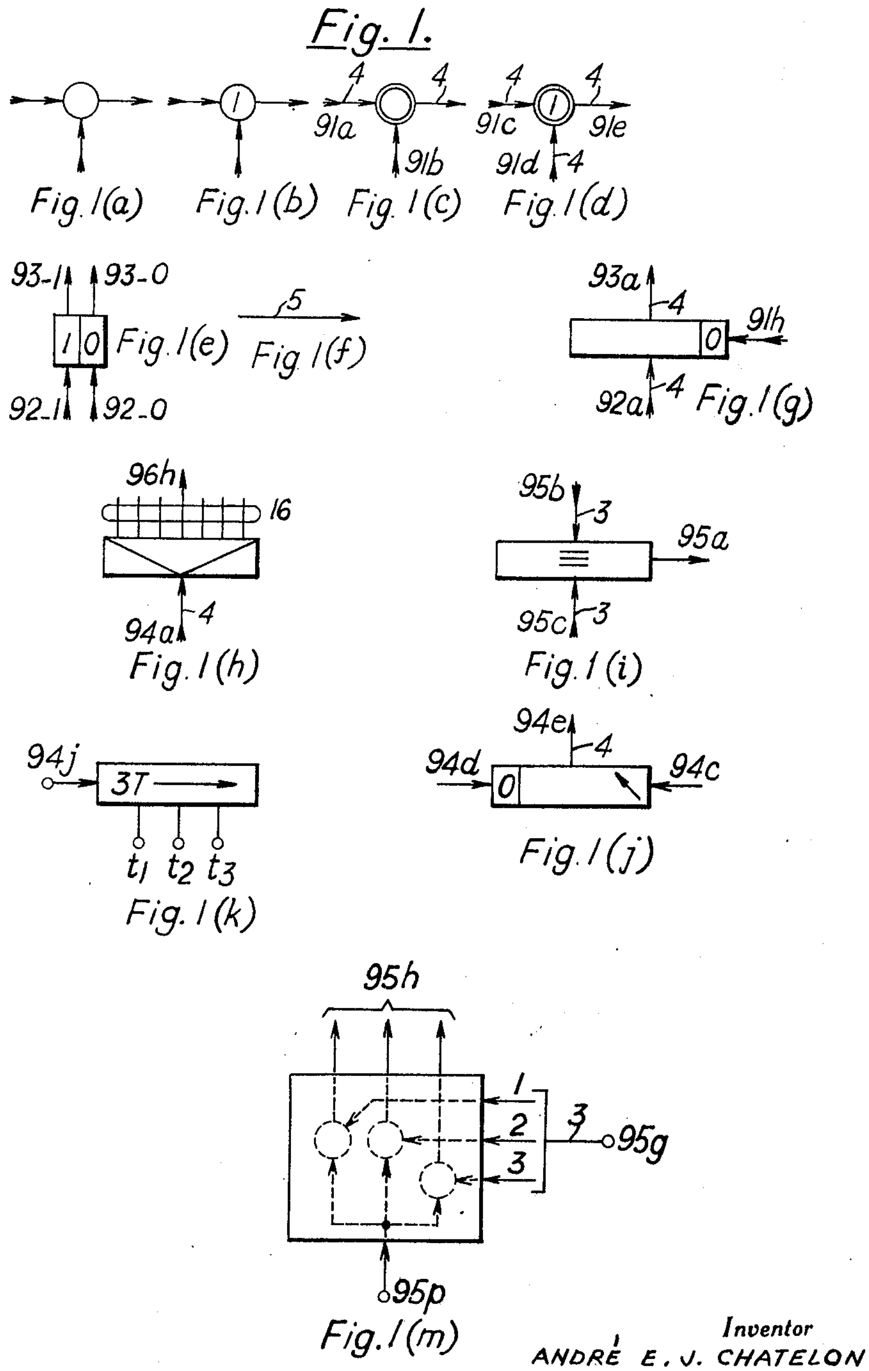
FIGURE 1 represents a certain number of symbols used in the FIGURES 3 and 6.

In relation with FIGURE 1, the meaning of certain particular symbols used in the drawings of the present patent will also be explained:

FIGURE 1($a$) represents a simple AND circuit;

FIGURE 1($b$) represents a simple OR circuit;

FIGURE 1($c$) represents a multiple AND circuit, which comprises, in the case of the example, four AND circuits, one of the inputs of which is connected to each one of the conductors 91$a$ the second input of which is connected to a common conductor 91$b$;

FIGURE 1($d$) represents a multiple OR circuit which includes, in the case of the example, four OR circuits with two inputs 91$c$ and 91$d$, and which enables to obtain, over the four output conductors 91$e$, the same signals as those applied either to one or the other of the inputs;

FIGURE 1($e$) represents a bistable circuit or "flip-flop" to which a control signal is applied on one of its inputs 92–1 or 92–0 in order to set it respectively to the 1 state or to the 0 state. A voltage of same polarity as that of the control signal is present, either on the output 93–1 when the flip-flop is in the 1 state, or on the output 93–0 when it is in the 0 state. If the flip-flop is referenced B1, the logical condition which characterizes the fact that it is in the 1 state will be written B1, that characterizing the fact that it is in the 0 state will be written $\overline{B1}$;

FIGURE 1(*f*) represents a group of several conductors, five in the considered example;

FIGURE 1(*g*) represents a flip-flop register. In the case of the figure, it comprises four flip-flops whose 1 inputs are connected to the conductors of the group 92*a* and 0 outputs are connected to the conductors of the group 93*a*. The digit "0" placed at one end of the register, means that this latter is cleared when a signal is applied on the conductor 91*h*;

FIGURE 1(*h*) represents a decoder which, in the case of the example, transforms a four-digit time slot binary code applied by the group of conductors 94*a* in to a code 1 out of 16, i.e. a signal appears on only one among the sixteen conductors 94*b* for each one of the numbers applied at the input;

FIGURE 1(*i*) represents a code comparator which delivers a signal on its output 95*a* when the three-digit codes applied on its inputs 95*b* and 95*c* are identical;

FIGURE 1(*j*) represents a flip-flop counter which counts the pulses applied on its input 94*c* and which is cleared by the application of a signal on its input 94*d*. The 1 outputs of the flip-flops are connected to the output conductors 94*e*;

FIGURE 1(*k*) represents a delay line of capacity 3T which delivers on its outputs *t*1, *t*2, *t*3, signals spaced by a time T and of duration identical to that of the signal applied on its input 94*j*;

FIGURE 1(*m*) represents a series-parallel conversion circuit. The conductor 95*p* on which the signals, transmitted in a series form, arrive in time succession, is multiplexed into three conductors and each one of these latter is connected to the first input of a different AND circuit. The second input of each one of these AND circuits is connected to one of the three conductors 95*g* which receive respectively the "advance signals" 1, 2, 3, set up in time succession. The three AND circuits are thus successively activated and the output signals appear in parallel form on the three conductors 95*h*. A circuit of the same type enables to carry out the series-parallel conversion.

As it has been seen previously, the image to be transmitted is analyzed line by line by a light beam. The light reflected by the document presents an amplitude which varies in accordance with the shade of the analyzed dot and it is sent on a photoelectric cell. The dimensions of the light beam define those of the elementary dot (usually: 0.25 x 0.25 mm.).

The amplitude of the signal delivered by the photoelectric cell represents thus the shade of the analyzed dot, and it is generally chosen to code it in two values corresponding to black and white.

A facsimile transmitter comprises the following elements:

A document carrier generally constituted by a drum;

An image scanning mechanism provided for the advance of the lines;

A line scanning mechanism provided for the analysis of the different dots of one line;

An analysis device of the type described hereabove driven by the line scanning mechanism.

A receiver comprises the same elements with the exception of the device driven by the line scanning mechanism, which is then constituted by a printing device.

The application of the present invention to a facsimile system in which the image scanning mechanism provides for a discontinuous displacement, i.e. line by line, of the drum, will be described by way of a non-limitative example, the line scanning mechanism in that system providing for a continuous advance of the scanning device, the analysis of each line starting from the left hand side.

The following symbols used in the transmitter will be then defined:

Signal of line J: signal indicating that the analysis device has just analyzed the last point of the line;

Dot signal or *synchronization signal* S: a signal characterizing the beginning of the analysis of a dot.

Since the analysis device is driven by a motor associated to a reducer, such a signal can be transmitted by an element fixed to one of the speed reducing gears and designed in such a way as it delivers a signal S for each displacement of 0.25 mm. of the analysis device. The time interval or *dot time slot* which separates a signal S from the next one is then reserved to the treatment of the analyzed dot.

Figures 1, 2, 3, 4, 5, 6:
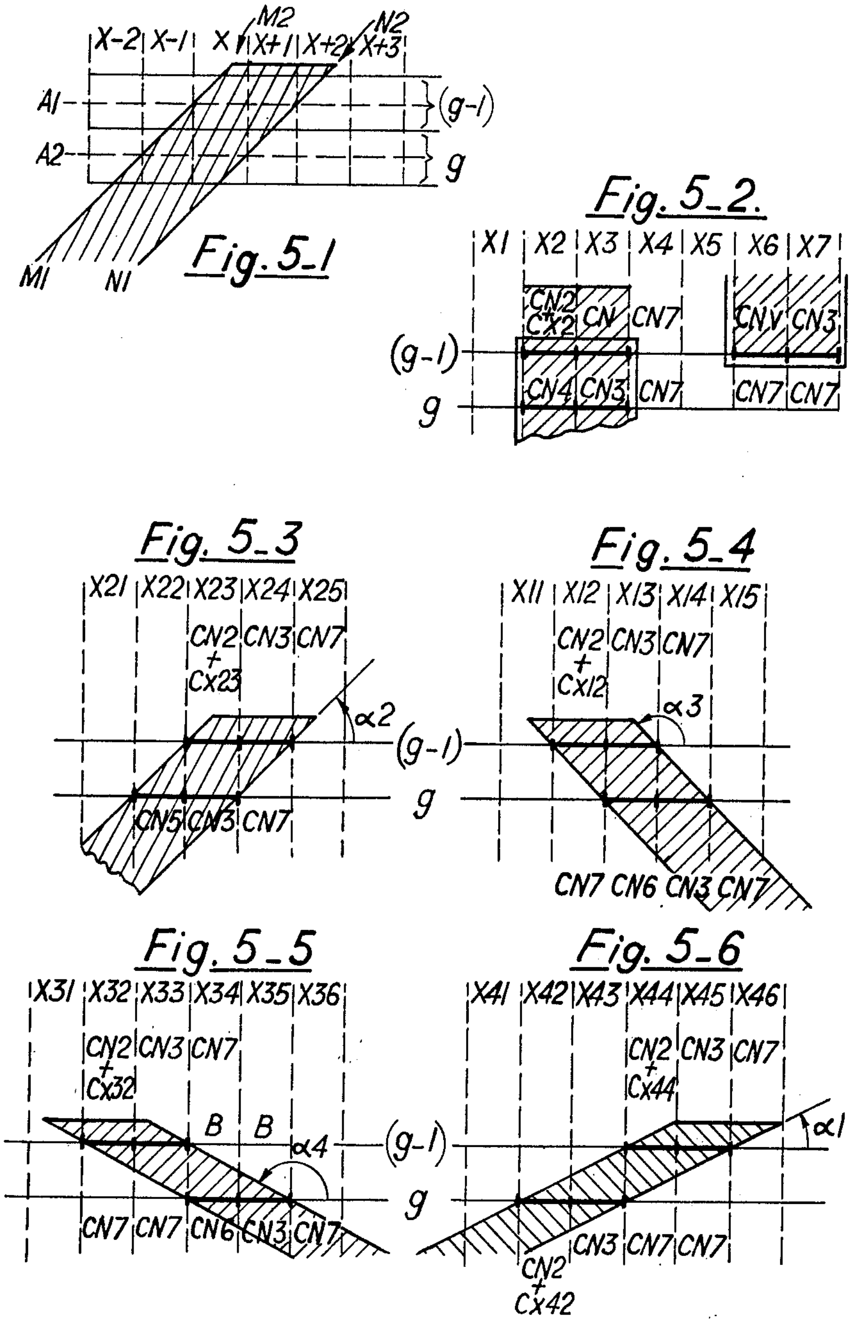
FIGURE 2 represents a certain number of diagrams of signals related to the operation of the facsimile system according to the invention.
FIGURE 4 represents a table of the geographical position of the dots examined in the image to be transmitted.
FIGURE 5 represents the study of the coding of a certain number of lines of variable inclination.
FIGURE 6 represents the diagrams of the circuits used for reception.
Figure 6:
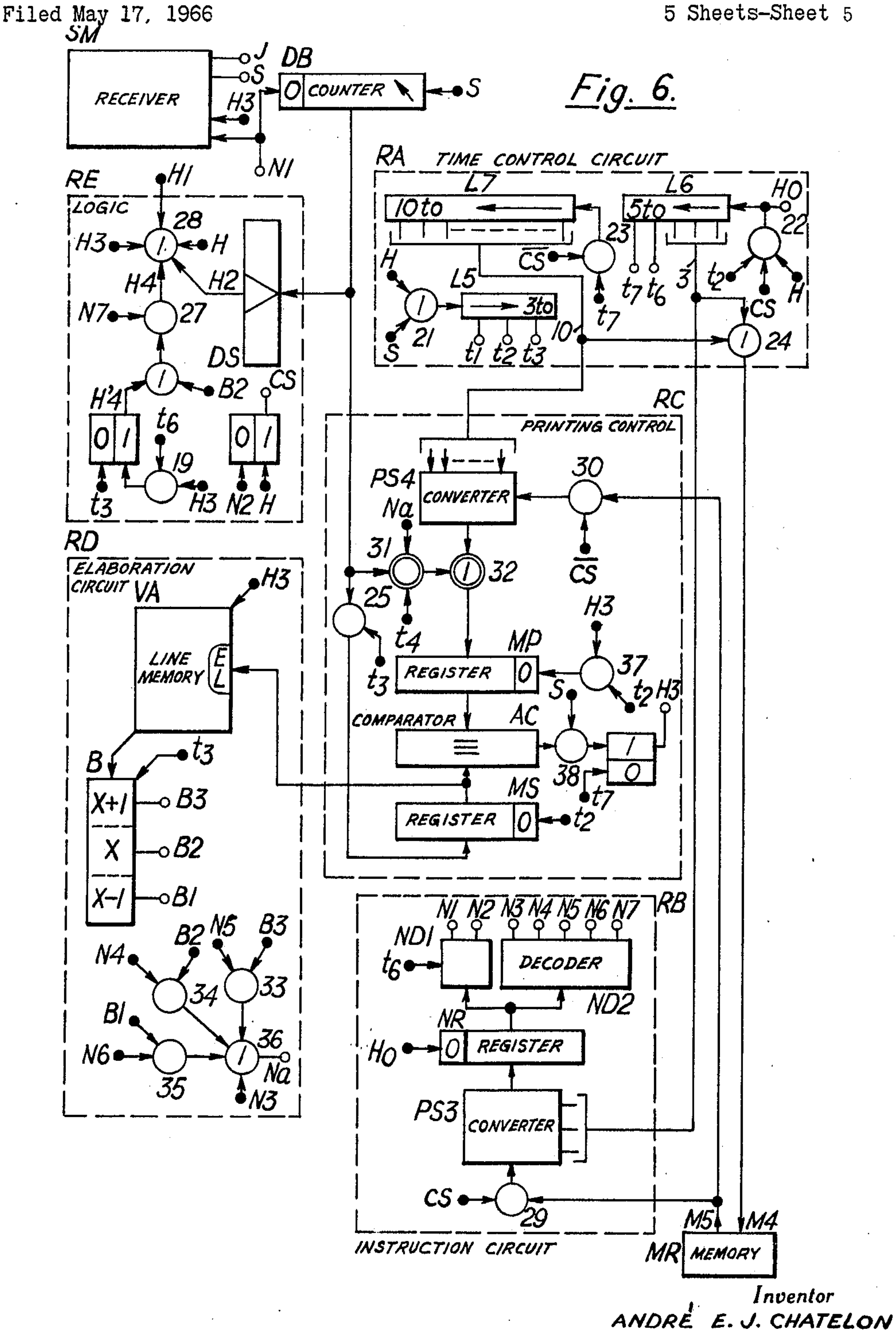

FIGURE 2 represents a certain number of signal diagrams related to the operation of the facsimile system according to the invention.

The diagram 2.1 represents two successive synchronization signals S1 and S2.

The diagram 2.2 represents eighteen *basic time slot signals t*1 to *t*18 which divide a dot time slot into eighteen time intervals. Each one of these signals has a duration *d* identical to that of the synchronization signal and they are delayed one with respect to the other by a time *t*0; the signal *t*1 being also delayed by *t*0 with respect to the signal S.

In the facsimile transmitter unit just briefly described, the synchronization signals are supplied by the analysis device and the elaboration of the digit time slot signals must be therefore controlled by these signals S. By way of a non-limitative example, one will describe, in relation with FIGURES 3 and 6, circuits in which the digit time slot signals are supplied by delay lines.

It is realized that other solutions exist for obtaining time signals. Thus, the basic time slot signals can be supplied by an oscillator, the signals S being then obtained by frequency division. In this case, a facsimile transmitter will be used in which the advance of the analysis device is controlled by the signals S.

Figure 3:
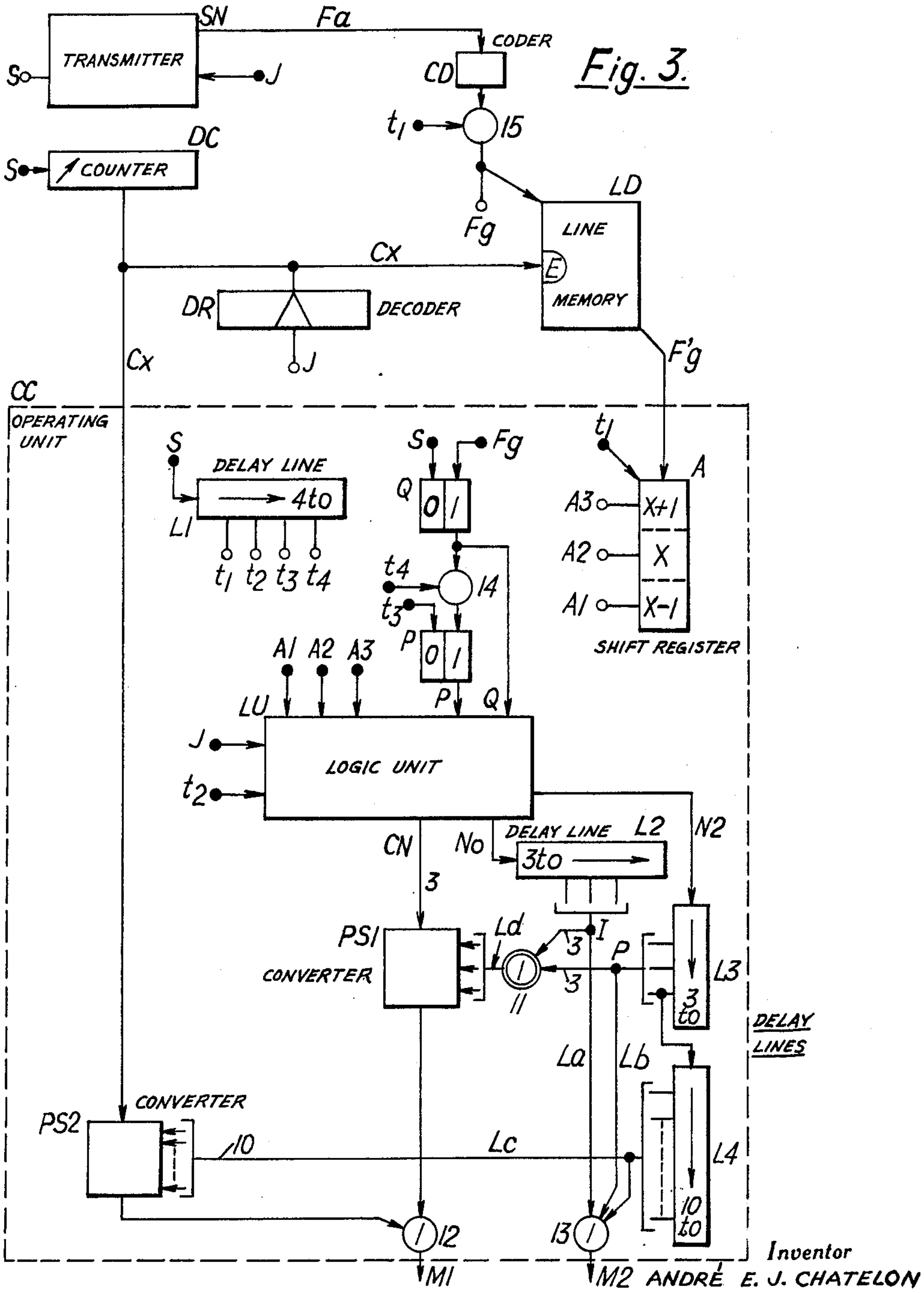
FIGURE 3 represents the diagram of the circuits used for transmission.

FIGURE 3 represents the general diagram of the circuits of the transmitter unit which are:

The facsimile transmitter SN;

The dot counter DC to which the decoder DR is associated;

The coder CD;

The line memory LD;

The operating unit CC.

Before describing the operation of this transmission unit, one will see that:

Each line of the document is analyzed in X dots, the abscissa of a given dot being referenced *x*. The analysis of this dot is carried out at the dot time *tx*;

Each document is analyzed in G lines, the ordinate corresponding to a given line being referenced *g*.

As it has been seen previously, the synchronization signals are supplied by the analysis device located in the transmitter SN. These signals are applied to the dot counter DC having a capacity X and which stores, at a given time *tx*, the code C*x* of the abscissa *x* of the analyzed dot. When the code CX (code of the abscissa of the last dot of the line) appears in this counter, the decoder DR delivers an end signal J which is applied to the transmitter SN and controls the advance, by one line, of the image scanning mechanism.

The transmitter SN delivers, on its output F*a*, an analog signal the amplitude of which represents the shade of the analyzed dot. This signal is applied to the threshold circuit CD which delivers at the time *t*1 (AND circuit 15) a signal F*g* when the shade which has to be transmitted is the black one.

This signal is stored in the line memory LD which is constituted either by a shift register of capacity $X-2$ or by a serially operated cyclic memory having a capacity of X information, but in which a given selection signal controls the selection of two different addresses at the writing and at the reading.

By way of a non-limitative example, the use of a memory of this last type will be described in which the address selection is controlled by the codes supplied by the dot counter DC. At time T*x*, the code C*x* controls, by a suitable decoding, the selection for reading of the address $x+1$ (address in which is written the information related to the point of abscissa $x+1$) and the selection for writing of the address *x*. Since the analysis concerns the line *g*, the information read is thus the shade information of the dot $x+1$ of the preceding line $g-1$. This information, which will be referenced F'*g*, is transmitted to the operating unit CC which receives also, at the same time T*x*, the information F*g* related, as it has been seen previously, to the point *x* of the line *g*. In this block CC, the information F*g*, elaborated in *t*1 is stored in the flip-flop Q which has been reset by the preceding signal S and it is transferred in the flip-flop P at the time *t*4 (AND circuit 14). Referring to the diagrams 2.5 and 2.6 of FIGURE 2 concerning respectively the flip-flops Q and P it is seen that, during the time *t*2, these flip-flops store the information related respectively, to the dot $x/g$ and to the dot $(x-1)/g$. The information F'*g* extracted from the memory LD is introduced in the shift register A which has a capacity of three bits, and which is controlled by the signals *t*1. This register contains thus, at the time T*x*, the information A3, A2, A1 related respectively to the dots of abscissa $x+1$, *x* and $x-1$ *of* the line $g-1$; these dots being referenced further on as dots $(x+1)/(g-1)$, $x/(g-1)$, $(x-1)/(g-1)$.

The signals *t*1, *t*4 which activate the AND circuits 14, 15 and control the advance of the register A are supplied, as well as the signals *t*2 and *t*3, by a delay line L1 which is controlled, at each dot time slot, by a signal S.

FIGURE 4 is a table which represents the geographical positions of the dots supplying the information P, Q, A1, A2 and A3 which have been just defined. On this figure, the line 4.1 represents the abscissa $x-2$, $x-1$, *x*, $x+1$, $x+2$, and the lines 4.2 and 4.3 are assigned respectively to the information coming from the lines $g-1$ and *g*. These five information constitute the *initial data* which will be used for the coding of the characteristic dots of the image, this operation being carried out in the logical unit LU.

This coding operation consists in comparing, at each time T*x*, the information Q to the information P, A1, A2, and A3, the comparison process being detailed in Table I hereafter. In this table the columns 1 to 5 are assigned to the shade, black or white, of the five dots considered; the columns 6 and 7 to the codes elaborated in the different cases and the column 8 to the corresponding logical equation. In these equations, the condition P, for instance, means that the corresponding dot $(x-1)/g$ is of black shade and the condition $\overline{P}$ means that this dot is of white shade. It will be noted that all the equations comprise the term *t*2 which characterizes the time at which the comparison is carried out in the unit LU.

TABLE I

| Q $x/g$ | P $(x-1)/g$ | A1 $(x-1/(g-1)$ | A2 $x/(g-1)$ | A3 $(x+1)/(g-1)$ | Result | | Logical equation |
|---|---|---|---|---|---|---|---|
| Black | Black | | | | Repetition | CN3 | $Q \times P \times t2$ |
| | White | Black | | | do | CN6 | $Q \times \overline{P} \times A1 \times t2$ |
| | | White | Black | | do | CN4 | $Q \times \overline{P} \times \overline{A1} \times \overline{A2} \times t2$ |
| | | | White | Black | do | CN5 | $Q \times \overline{P} \times \overline{A1} \times \overline{A2} \times A3 \times t2$ |
| | | | | White | Start-of-rum | CN2+Cx | $Q \times \overline{P} \times \overline{A1} \times \overline{A2} \times \overline{A3} \times t2$ |
| | Black | | White or black | | | | |
| White | Black | | | | Non-inscription | CN7 | $\overline{Q} \times (P+A2) \times t2$ |
| | White of black | | Black | | | | |

The comparison process controlled by the condition Q (dot $x/g$ is black) may be detailed as follows:

(1) the shade of the dot $(x-1)/g$ is examined and if this dot is black, a repetition code referenced CN3 is transmitted;

(2) in the opposite case characterized by the logical condition $Qx\overline{P}$ (see column 8 of the table) one of the three repetition codes CN6, CN4, CN5 is elaborated according to the information written in the register A.

The information which is first used is that related to the dot $(x-1)/(g-1)$ and it controls the elaboration of a code CN6 for the condition A1. In the case of condition $\overline{A1}$, the information related to the dot $x/(g-1)$ is then used and it supplies a code CN4 for the condition $\overline{A1}xA2$. In the case $\overline{A1}x\overline{A2}$, the information of the dot $(x+1)/(g-1)$ is used a code CN5 is elaborated for the condition $\overline{A1}x\overline{A2}xA1$.

For the condition $\overline{A3}$, $\overline{A2}x\overline{A1}$—i.e. if the three dots of the line $g-1$ examined are white, as well as the dot $(x-1)/g$, a *start-of-run code* CN2 is elaborated and its transmission is followed by that of the address code C*x* of the dot *x*.

For the condition $\overline{Q}$ (dot $x/g$ of white shade):

(1) the shade of the dots $(x-1)/g$ and $x/(g-1)$ is examined and a *non-inscription code* CN7 is transmitted if one of these two dots is black. It will be noted that the condition $\overline{Q}xP$ corresponds to the end of a line on the line g and that the condition $\overline{Q}xA2$ means that a line ends on the same abscissa of the corresponding line. The reasons for the sending of a code CN7 in this case will be explained during the study of the reception unit;

(2) In all the other cases no code at all is transmitted. The process chosen enables to avoid the transmission of an address code during the analysis of the dot $(x+1)/g$ in the case where the dot $x/g$ is surrounded by dots $(x-1)/g$, $x/(g-1)$, $(x+1)/g$ of black shade, which may occur for instance when there are defects in the image.

Last, a *line start code* CN1 is transmitted at the beginning of the analysis of each line.

The FIGURES 5.1 to 5.6 represent the codes transmitted during the analysis of constant width lines starting at the line $g-1$ and presenting different slopes with respect to the analysis lines.

FIGURE 5.1 represents six consecutive dots of the lines *g* and $g-1$ shown under the form of squares which symbolize the shape of the light beam, the line to be analyzed being bounded by the segments M1M2, M2N2, N1N2. It is assumed that the coder CD of FIGURE 3 delivers a signal F*g* when the analyzed dot comprises a black zone of surface at least equal to half of the surface of the light beam. In order to simplify the explanation, especially in the case of oblique lines, it will be assumed that the segments which bound them cross the verticals in their middle point. Under these conditions, if the shade is measured on the horizontal lines such as A1 and A2, the analyzed dots are totally black or totally white.

FIGURE 5.2 represents two vertical lines at right angles with the lines and it is seen that, whatever may be the length of this line, the address code is transmitted only when the line is analyzed for the first time.

The FIGURES 5.3, 5.4 and 5.5 represent oblique lines with slopes of 45°, 135° and 153° and for which the code C*x* is transmitted only at the first analysis.

It may be deduced from these figures that the elaborated codes are:

For the first line: the codes CN2 and Cx followed by a certain number of codes CN3 depending upon the line width;

For the next lines: the code CN4, CN5 or CN6 followed by a number of codes CN3 depending upon the line width.

These codes are followed by a code CN7 which is elaborated by the first white following a black (condition $\overline{Q}x$P of Table I).

The FIGURE 5.6 represents an oblique line making an angle of 27° with the lines. It is seen that in this case, which is that of a line making a small angle with respect to the lines, a code Cx is transmitted at each analyzed line. Nevertheless, in the case of a line parallel to the analyzed lines, the case of FIGURE 5.2 occurs again.

It will be noted that the inclination zone for which a code Cx is transmitted at each line, may be reduced by comparing the dot $x/g$ to a higher number of dots of the line (g—1).

Referring to FIGURE 5.2, it is seen that this latter represents two vertical lines, the one on the right hand side ending at the line $(g-1)$. During the coding of the line $g$, the condition $\overline{Q}x$A2 (see Table I) controls the sending of codes CN7 during the coding of the shade of the dots of abscissa $x6$ and $x7$ belonging to the line $g$.

The mode of elaboration of exploitation of the codes will now be described more in detail, in relation with FIGURE 3 and Table I.

As it has been seen previously, the information P, Q, A1, A2, A3 are applied to the logical unit LU as well as the signal $t2$ supplied by the delay line L1 and the signal J of end of a line.

The unit LU comprises a certain number of AND and OR circuits which materialize the logical conditions represented in column 8 of Table I, the code CN1 being directly elaborated under the control of signal J. This unit is activated by the signal $t2$ and supplies at this basic time slot the following information:

A three-digit instruction code which is present in parallel form on its output CN;

An instruction signal N0 represented on the diagram 2.3 which appears each time an instruction code is elaborated;

A signal N2 which appears when the instruction code elaborated is the code CN2.

The signals N0 and N2 are applied respectively to the delay lines L2 and L3 which have a capacity of 3 to and which deliver signals at the basic times slots $t3$, $t4$, $t5$ (see diagram 2.4) on the groups of conductors L$a$ and L$b$. These signals are mixed in the multiple OR circuit 11 and appears on the group conductors L$d$.

Besides, the signal $t5$ supplied by the delay line L3 controls the delay line L4 of capacity 10 to which delivers, on the group of conductors L$c$, signals at the times $t6$ to $tt15$.

Last, the sixteen output conductors of the delay lines L1, L2, L3 are applied to the OR circuit 13 which thus supplies, on its output M2, a signal at each basic time slot at which a code digit is transmitted on the output M1.

The instruction code CN is applied to the converter PS1 which, under the control of the three signals applied on its input L$d$, transmits it in a series form towards the output M1. In the same way, an address code, available in a parallel form in the counter DC, is applied to the converter PS2 which, under the control of the ten signals applied on its input L$c$, transmits it in a series form towards this same output M1.

A coding process of the information supplied by a facsimile transmitter has just been described, the code information being available on the output M1. It is realized that the reduction of the information obtained by this process, which elaborates codes in a discontinuous manner, can be fully exploited only if these latter may be transmitted in a continuous way.

The continuous transmission may be obtained either by controlling the scanning speed by the number of information elaborated by the operating unit, or by writing the information M1 in a memory and in transmitting them in a continuous form. This memory may be either a matrix memory or a magnetic support member (magnetic tape for instance) in which the signals M2 are used for controlling, during writing, the advance of the address selector or of the tape.

As it has been seen at the beginning of the description, the facsimile receiver includes the following elements:

A document carrier constituted generaly by a drum;

An image scanning mechanism providing for the advance of the lines in a discontinuous manner;

A line scanning mechanism providing for the continuous analysis of the different dots of the line;

A printing device driven by the line scanning mechanism and providing for the printing on the document of a black dot of 0.25 mm. x 0.25 mm. under the control of a *black signal* which will be designated by H3.

The receiving operation unit includes a memory MR identical to that used for transmission which stores the information related to the document to be reproduced.

The starting of the line scanning mechanism of the receiver is carried out under the control of a *start signal* H1 which controls also the reading of an instruction in the memory MR and, afterwards, each instruction used controls the reading of a new instruction. When a line start instruction N1 is read, it controls an advance by one line of the image scanning mechanism and the positioning of the printing device at the left hand side of the document.

The line scanning mechanism, which is identical to that of the transmitter, is driven in a continuous way, its coding disc supplying synchronization signals S which control, in the same way as in the transmitter, the advance of a bit counter which will be designated by DB and which is cleared by a signal N1 obtained by the decoding of a line start instruction. In the same way, as in the transmisison unit, the time interval T included between two successive synchronization signals S is divided into eighteen basic time slots which enable the achievement of the longest operation related to a given dot, i.e. the reading, in the memory MR, of two codes CN2 and Cx.

FIGURE 6 represents the diagram of the circuits used at the reception and which include, with the facsimile receiver SM, the circuits of the reception operating unit which are subdivided as follows:

The bit counter DB identical to the counter DC of FIGURE 3;

The time control circuit RA which supplies, in particular, the reading control signals M4 of the memory MR;

The instruction receiving circuit RB which supplies signals N1, N2 . . . N7 corresponding to the instruction codes CN1, CN2 . . . CN7 extracted from the memory MR;

The printing control circuit RC supplying a signal for black H3 at each time Tx at which a black shade dot must be printed;

The circuit RD of elaboration of repetition orders, which delivers a repetition signal of black N$a$ in accordance with the repetition instruction received (instructions N3, N4, N5 or N6) and with the shade of the contiguous dots of the lines $g$ or $(g-1)$, this signal being used in the circuit RC;

The logical unit RE supplies a signal CS or its complement $\overline{CS}$ according to whether the next reading in the memory MR concerns an instruction code or an address code and a signal H which controls the reading of an instruction code.

The operation of the time control circuit RA in which the time signals $t1$ to $t17$ are supplied by the delay lines L5, L6, L7 will be first described.

The delay line L5 which supplies the signals *t*1, *t*2, *t*3 is controlled by the logical condition $H1+S$ (OR circuit 21) and enables to define the first basic time slots of a dot time slot.

The delay line L6, which is controlled by the logical condition: $Ho=CSxHxt2$ (AND circuit 22) defines the times *t*3, *t*4, *t*5 of an instruction code reading which comprises three digits as it hase been seen previously, as well as the two following times *t*6 and *t*7. Last, the delay line L7, which is controlled by the logical condition $\overline{CS}xt7$ (AND circuit 23), defines the times *t*8 to *t*17 for reading an address code C*x* which comprises ten digits.

The signals supplied by the lines L6 and L7 (with the exception of the signals *t*6 and *t*7) are mixed (OR circuit 24) then transmitted, over the conductor M4, towards the memory MR in which they control the reading of the information.

FIGURE 7 represents diagrams of signals related to these operations. The diagram 7.1 represents one of the signals *t*3, *t*4 . . . of duration *d* and the diagram 7.2 represents the access time *ta* to the memory which comprises the address selection time and the time during which a parasitic signal appears in the case of a matrix memory and the time *tb* at which appears effectively a sense signal on the input M5, this time being defined by a time selection signal. Besides, the change of address of the one or several selectors of the memory is carried out during the time interval $(to-d)$ which separates two basic signals (see diagram 2.2).

It is thus seen that one has chosen $d>ta+tb$ so that the time *d* has a duration sufficient for controlling the reading of one address of the memory MR and for receiving the sensed signal.

The operation of the receiving unit will be described now, in the different cases which may occur, beginning with the starting of the receiver under the control of a start signal H1 applied manually.

This signal, the duration of which is assumed to be calibrated to *d* (by a conostable circuit for instance), is applied to the OR circuits 21 (located in the circuit RA) and 28 (located in the circuit RE) and controls first the setting of the logical condition CS (signal H supplied by the OR circuit 28) and second the elaboration of the signals *t*1, *t*2, *t*3 by the delay line L5.

At time *t*2, the AND circuit 22 (circuit RA) is activated and the delay line L6 supplies, in particular, the signals *t*3, *t*4, *t*5 (see diagram 2.4) which are sent to the memory MR in order to control the reading of the information written in the three first addresses.

It will be assumed that the memory MR is designed in a classical way for supplying as many elementary information as reading signals are transmitted to it through the conductor M4. If one happens to be placed at the beginning of a page, a code CN1 is extracted which appears on the input M5 and which is applied to the instruction receiving circuit RB. Since the AND circuit 29 is energized by the signal CS, the code signals are applied to the series-parallel converter PS3 and the code CN1 is written in parallel form in the register NR cleared by the signal H*o* (AND circuit 22), the conversion being controlled by the signals *t*3, *t*4, *t*5 supplied by the delay line L6. This code is decoded in *t*6 by the circuit ND1 which supplies a signal on its output N1. This signal is applied to the fac-simile receiver SM and to the counter DB in order to advance by one line the image scanning mechanism and to clear the counter. The line scanning mechanism is then driven and each pulse S which it transmits, controls the writing of the corresponding address code in the counter DB and the transmission of the signals *t*1, *t*2, *t*3 (OR circuit 21, circuit RA). When the code C*x*1 of the first dot of the line is written in the counter, the decoder DS located in the circuit RE delivers a signal H2 which is applied to the OR circuit 28. This latter delivers then an instruction reading signal H which is applied to the 1 input of the flip-flop CS which is already in the 1 state. The signal *t*2 controls then, as in the case of the start, the elaboration of the signals *t*3 to *t*7 by the delay line L6. The signals *t*3 to *t*5 control the reading of a three-digit instruction, in the memory MR, this instruction being available on the corresponding output of one of the decoders ND1 or ND2.

It will be assumed that the code received is the code CN2, so that the decoder ND1 supplies a start-of-run signal N2 at the time *t*6.

The flip-flop CS (circuit RE) resets then to the 0 state thus supplying a signal $\overline{CS}$ and, at the next time *t*7, the AND circuit 23 (circuit RA) is energized so that the delay line L6 elaborates the signals *t*8 to *t*17 which control the sensing, in the memory MR, of ten consecutive digits which constitute an address code. These information, which appear at the output M5 of the memory MR, are treated in the printing control circuit RC. They are applied, by the activation of the AND circuit 30 for the condition $\overline{CS}$, to the series-parallel converter PS4 and are written in parallel in the register MP under the control of the signals supplies by the delay line L7.

At the end of the time *t*17, the address code is written completely in this register and it is compared to the code C*x*1 transferred in *t*3 (AND circuit 25) from the bit counter DB to the register MS.

If the two codes are identical, the comparator AC delivers a signal starting from the time *t*17. This signal is applied to the flip-flop H3 when the next signal S appears (AND circuit 38).

A black signal H3 appears then in *t*1 and it is applied to the facsimile receiver SM in order to control therein the printing of a black dot. At time *t*2, the register MS is cleared and the register MP is cleared for the logical condition $H3\ x\ t2$ (AND circuit 37) and at the time *t*7, the flip-flop H3 is reset to zero.

If the compared codes are not identical, the register MP is not cleared and the code stored therein is compared successively to the address codes C*x*2, C*x*3, . . . supplied by the dot counter DB up to the time where a signal H3 appears.

It will be noted that this signal appears with a delay of one digit time dot with respect to the address in which printing must be carried out. It is realized that the shifting by one dot during printing has no importance.

One will now described the operation of the receiving unit in the case where one of the repetition instructions N3, N4, N5 or N6 which are treated in the circuit RD of repetition order elaboration is received.

This circuit includes the electronic gates 33 to 36 as well as the line memory VA and the shift register B which are identical respectively to the circuits LD and A of the transmission unit (see FIGURE 3).

The address selection in the memory VA is carried out under the control of the address codes written in the register MS (circuit RC) and an information is written in the selected address if a black signal H3 is present. This memory is organized in such a way as, at the time of analysis of a dot of abscissa *x*, the information concerning the dots $(x-1)$, $x$, and $(x+1)$ of the line $(g-1)$ are written respectively in the cells B1, B2, B3 of the register B; the advance of which is carried out at the time *t*3. The electronic gates 33 to 36 elaborate from the time *t*4 on, a signal for the logical condition:

$$Na=N3+(N4xB2)+(N5xB3)+(N6xB1) \qquad (1)$$

It will be noted that two repetition codes received successively—except if they are CN3 codes—may concern two different analyzed lines so that the signal N*a* does not appear, in the case, at the same repetition period as the second one of these codes.

When this signal N*a* appears, it is applied to the multiple AND circuit 31 located in the circuit RC which controls, at the time *t*4, the transfer of the code C*x* in the register MP. Since the same code is written in the register MS, a signal H3 is thus produced at the following time $t1$ and controls the printing of a black dot.

In relation with Table I, the conditions for the appearing of a signal N$a$ at the reception of a repetition code will be checked, having in mind that the presence of such a code means that the dot $x/g$ is black:

(1) *Repetition code CN3* (the dot $x-1/g$ is black): a signal N$a$ is elaborated directly (see Equation 1).

(2) *Repetition code CN4* (the dot $(x-1)/(g-1)$ is white, the dot $x/(g-1)$ is black): the register B delivers a signal on its output B2 and it is seen from Table I, that the homologous condition at the transmission (condition A2) appears only in this case. The logical condition $N4xB2$ is thus sufficient for elaborating a signal N$a$.

(3) *Repetition code CN5* (the dots $(x-1)/(g-1)$ and $(x-1)/g$ are white, the dot $(x+1)/(g-1)$ is black): the register B delivers a signal on its output B3 and it is seen on Table I, that the homologous condition at the transmission (condition A3) appears only in this case. The logical condition $N5xB3$ is thus sufficient for elaborating a signal N$a$.

(4) *Repetition code CN6* (the dot $(x-1)/g$ is white, the dot $(x-1)/(g-1)$ is black): the register B delivers a signal on its output B1 and it is seen, on Table I, that the homologous condition at the transmission (condition A1) appears only in this case. The logical condition $N6xB1$ is thus sufficient for elaborating a signal N$a$.

Last, we shall study the operations controlled by a non-inscription signal N7 which characterizes (see Table I and FIGURE 5.2) some dots of white shade close to the dot $(x-1)/g$ or to the dot $x/(g-1)$.

This particular code enables to avoid writing errors of considerable amplitude which would happen during the extraction from the memory M3 of the repetition codes defining the dot $x/g$ with respect to the contiguous dots $(x-1)$, $x$, $(x+1)$ of the line $(g-1)$ (codes CN4, CN5, CN6).

In effect, the repetition codes are written one after the other in the memory MR and are thus read successively, which might introduce many possibilities of errors.

The first case of error presents itself, for instance, when the last code CN3 of the line of the FIGURE 5.3 is followed by a code CN6 which is extracted from the memory MR at the time T$x$.24 of the analysis of the line $g$. The condition $N6xB1$ is then fulfilled and a wrong inscription takes place.

The second case of error happens when a code CN4, CN5 or CN6 is extracted from the memory and when a line ending at the line $(g-1)$ presents itself. The analysis of this line yields one or several of the signals B1, B2, B3 which provoke writing errors.

Last, when a code CN6 is extracted from the memory, it is seen, by comparing the FIGURES 5.4 and 5.5 that it may belong to lines of different slopes and in fact, this code would provoke—if it has been obtained by the analysis of the line $g$, FIGURE 5.5—the wrong inscription of a black dot at the address $x$.33 and the reproduced line would be that of the FIGURE 5.4.

The elaboration of a non-inscription code CN7 according to the conditions stated in Table I, enables to avoid these causes of error as it may be seen on FIGURES 5.2 and 5.5. It will be reminded that this code CN7 appears either when a white dot follows a black dot (condition $\overline{Q}xP$), or when a white dot which does not follow a black dot is located under a black dot of the preceding line (condition $\overline{Q}xA2$). In order to differentiate these two cases at the reception, the shade of the dot $(x-1)/g$ is written in the flip-flop H'4 which sets to the 1 state when the preceding dot is black.

The instruction N7 supplied by the decoder ND2 controls, in the circuit RE, the elaboration of a read signal H or the memory MR for the condition $$H4=N7x(H'4+B2)$$

this condition being set up by the AND circuits 19, 27, the OR circuit 20 and the flip-flop H'4.

In order to study the elaboration of this signal H4, it will be supposed that a code CN3 has been extracted from the memory MR at the dot time T$(x-1)$, so that a black signal H3 is present at the beginning of the time T$x$ and that this signal controls first the printing of a black dot at the abscissa $x$ and second, the reading—in the memory MR—of a code CN7 which is decoded into a signal N7 starting from the time T$x.t6$ on basic time slot $t6$ of the dot time slot (T$x$).

At this same time T$x.t6$, the flip-flop H'4 sets to the 1 state (AND circuit 19), this characterizing the fact that the preceding dot is black, and the AND circuit 27 supplies a signal H4 and a signal H. This signal is utilized in T$(x+1).t2$ (AND circuit 22) for controlling a new reading and the flip-flop H'4 is reset to the 0 state at the time $t3$.

When the condition $\overline{H3}$ is fulfilled at the beginning of the time T$x$ and a signal N7 is available in T$x.t6$, this signal remains on the corresponding output of the decoder ND2. The bit counter advances and controls the reading of the information written in the memory VA up to the time where the condition $N7xB2$ (logical circuits 20 and 27) is fulfilled, this latter condition controlling the elaboration of the signals H4 and H. One is thus assured that, when one of the codes CN4 and CN6 appears, it refers to the first black dot which will appear on the line $(g-1)$.

It will be noted that in the circuit just described, each instruction which has been decoded, as well as the signal H1, controls the reading of an instruction by the logical conditions:

$$CSxt2 \text{ or } \overline{US}xt7$$

applied to the delay lines L6 and L7. In effect:

(1) The signal CS appears for the logical condition: $H1+H2+H3+H4$ in which the signal H3 has been elaborated by the reading of the instructions N3, N4, N5, N6, N7, the signal H1, by the reading of the instruction N1, the signal H2 at the start of the line and the signal H4 by an instruction N7.

(2) The signal $\overline{CS}$ appears when an instruction N2 is read.

While the principles of the above invention have been described in connection with specific embodiments and particular modifications thereof it is to be clearly understood that this description is made by way of example and not as a limitation of the scope of the invention.

What is claimed is:

1. A reduced-time transmission system comprising:
transmitter means wherein each line of a document is analyzed in X dots and each document is analyzed in G lines, such that the output of said transmitter means is a code representative of the position of each analyzed dot;
receiver means for converting said code, such that said document is reproduced at said receiver means according to the position of each analyzed dot;
said transmitter means including:
a scanner operating continuously and delivering a synchronization pulse at the beginning of each dot time slot;
a dot counter which advances under the control of the synchronization pulses and which stores the addresses of the scanned dots;
a coder which codes the shade of the scanned dot into two levels;
a line memory having a capacity of $x$ information;
a three-bit shift register receiving the information read in the line memory, said memory being so organized that, when the coder delivers the information relative to a scanned dot $x$ of a line $g$, the shift register stores the information relative to dots $(x+1)$, $x$, and $(x-1)$ of a preceding line $(g-1)$;
a one-bit memory storing the information relative to a dot $(x-1)$ of line $g$; and an information processing circuit which receives, as input signals, the information relative to the scanned dot and the information delivered by the shift register and the one-bit memory, whereby said circuit produces instruction and address codes representing the scanned document.

2. A system according to claim 1 wherein said receiver comprises:

a serial type receiving memory;

clock means delivering read-out selection signals for reading, in serial form, the content of said memory;

a print-out means operating continuously and delivering a synchronization pulse at the beginning of each dot time slot;

a dot counter which advances under the control of the synchronization pulse and stores the address of the scanned dots;

logic means for producing an instruction code read-out signal in response to either a first, second, and third control signal, and an address read-out signal in response to a fourth control signal;

said clock means delivering read-out selection signals for reading one instruction code when activated by a first, second, third, fourth control signal, and one address code when activated by a fifth control signal;

an instruction receiving circuit to which are applied to the codes read-out from the receiving memory under the control of a first, second, third, fourth control signal, and which has a decoder delivering a particular signal for each of the different instruction codes;

a repetition order elaboration circuit having a line memory identical to that associated with the transmitter, a three-bit shift register receiving the information read in the line memory and storing, during the dot time slot of dot $x/g$ the information B1, B2, B3 relative respectively to dots $(x-1)$, $x$, $(x+1)$ of line $(g-1)$, a one-bit memory for storing the state of dot $(x-1)/g$, and a logical circuit which delivers a repetition signal N*a* whenever said information B1, B2, B3 coincide respectively with a second, a third, a fourth repetition code or when a first repetition code is received;

a printing command circuit having a register in which the address code is transferred, at each dot time slot, from the dot counter, and a code comparator which compares the content of said register either to the code stored in the dot counter under the control of a repetition signal, or to the address code read from the receiving memory under the control of an address read-out signal, said comparator delivering a printing signal applied said print-out means at the dot time slot when the compared codes are identical; and means for elaborating the control signals in the logic means having a manual start device for delivering a first control signal, a logic circuit delivering a second control signal when the dot counter contains the code of the first dot on a line, a third control signal when a printing signal appears, a fourth control signal when a printing signal appears, a fourth control signal when a non-inscription instruction appears either in the same time that the three-bit shift register shows that the dot $x$ of line $(g-1)$ is black or when the one-bit memory shows that the dot $(x-1)$ of line $g$ is black, and a fifth control signal when a start-of-run instruction appears.

3. A system according to claim 1 wherein the information processing circuit comprises first means operative when the scanned dot is black, said first means including:

means operative if the dot $(x-1)$ of line $g$ is black for elaborating a first repetition code;

means operative if said dot $(x-1)$ of line $g$ is white and dot $(x-1)$ of line $(g-1)$ is black for elaborating a second repetition code;

means operative when both above stated dots are white and dot $x$ of line $(g-1)$ is black for elaborating a third repetition code;

means operative when the three above stated dots are white and dot $(x-1)$ of line $(g-1)$ is black for elaborating a fourth repetition code; and means operative when all above stated dots are white for producing a start-of-run code.

4. A system according to claim 3 wherein said information processing circuit comprises second means operative when the scanned dot is white and when either of dots $(x-1)$ of line $g$, or dot $x$ of line $(g-1)$ is black for elaborating a non-inscription code.

5. A system according to claim 4 comprising:

a serial type memory;

means for storing into said memory the repetition codes, the start-of-run codes, and the non-inscription codes; and means for transferring the address code from the dot counter into said memory immediately after the transfer of the start-of-run code.

6. A system according to claim 5 wherein the transmission between said transmitter and receiver means is made, according to the capacity of the transmitting medium, by transferring the content of the transmitter memory into a memory in the receiver means.

7. A reduced-time transmission method comprising the steps of:

scanning a document in G lines and X dots per line;

coding the shade of the scanned dot into two levels;

storing of X information in a line memory;

receiving the information in a three-bit shift register from said line memory, said memory being so organized that, when the coder delivers the information relative to a scanned dot $x$ of a line $g$, the shift register stores the information relative to dots $(x+1)$, $x$, and $(x-1)$ of a preceding line $(g-1)$;

storing information relative to a dot $(x-1)$ of line $g$ in a one-bit memory; and producing instruction and address codes representing the scanned document in an information processing circuit.

8. A method according to claim 7 including the steps of:

storing said codes in a serial type memory;

transferring said codes out of the transmitter to a receiver; and receiving said codes in a serial type receiving memory.

9. A method according to claim 8 further including the steps of:

producing a first, second, third, fourth, and fifth control signal;

producing in a logic means an instruction code read-out signal in response to either a first, second, and third control signal, and an address read-out signal in response to a fourth control signal;

delivering by clock means read-out selection signals for reading one instruction code when activated by a first, second, third, fourth control signal, and one address code when activated by a fifth control signal; and applying to an instruction receiving circuit the codes read-out from the receiving memory under the control of a first, second, third, fourth control signal, and which has a decoder delivering a particular signal for each of the different instruction codes;

storing in a repetition order elaboration circuit, said circuit having a line memory, a three-bit shift register for storing during the dot time slot of dot $x/g$ the information relative to dots $(x-1)$, $x$ $(x+1)$ of line $(g-1)$, a one-bit memory for storing the state of dot $(x-1)/g$, and a logic circuit which delivers a repetition signal whenever said information coincides with a second, a third, a fourth repetition code or when a first repetition code is received; and applying a printing signal to a print-out means by a printing command circuit having a register in which the address code is transferred, at each dot time slot, from the dot counter, and a code comparator which compares the content of said register either to the code stored in the dot counter under the control of a repetition signal, or to the address code read from the receiving memory under the control of an address read-out signal, whereby said printing signal is applied at the dot time slot when the compared codes are identical.

References Cited

UNITED STATES PATENTS

| | | |
|---|---|---|
| 3,305,841 | 2/1967 | Schwartz. |
| 3,347,981 | 10/1967 | Kagan. |

ROBERT L. GRIFFIN, Primary Examiner

JOSEPH A. ORSINO, JR., Assistant Examiner

U.S. Cl. X.R.

178—5, 66; 325—38